United States Patent
Marcovecchio et al.

(10) Patent No.: US 6,447,047 B1
(45) Date of Patent: Sep. 10, 2002

(54) VEHICLE DOOR COMPRISING A PANEL ATTACHED DIRECTLY TO THE STRUCTURE OF THE DOOR

(75) Inventors: Dominique Marcovecchio, Asnieres sur Seine; Olivier Brianceau, Meru, both of (FR)

(73) Assignee: SAI Automotive Allibert Industrie, Nanterre (FR)

( * ) Notice: Subject to any disclaimer, the term of this patent is extended or adjusted under 35 U.S.C. 154(b) by 0 days.

(21) Appl. No.: 09/924,105

(22) Filed: Aug. 8, 2001

(30) Foreign Application Priority Data

Aug. 8, 2000 (FR) .......................................... 00 10444

(51) Int. Cl.⁷ .................................................. B60J 5/00
(52) U.S. Cl. ............................... 296/146.7; 296/146.6; 49/502
(58) Field of Search ............................. 296/146.7, 149, 296/154, 146.6; 49/502

(56) References Cited

U.S. PATENT DOCUMENTS

| | | | | |
|---|---|---|---|---|
| 3,808,743 A | * | 5/1974 | Renner et al. ................. | 49/502 |
| 3,964,208 A | * | 6/1976 | Renner et al. ............ | 296/146.6 |
| 5,040,335 A | * | 8/1991 | Grimes .................... | 296/146.7 |
| 5,048,234 A | * | 9/1991 | Lau et al. ................. | 296/146.7 |
| 5,102,163 A | * | 4/1992 | Ishikawa .................. | 296/146.7 |
| 5,111,619 A | * | 5/1992 | Billin et al. .................... | 49/502 |
| 5,345,720 A | * | 9/1994 | Illbruck et al. ........... | 296/146.7 |
| 5,345,721 A | * | 9/1994 | Stein et al. ............... | 296/146.7 |
| 5,395,135 A | * | 3/1995 | Lim et al. ...................... | 49/502 |
| 5,482,344 A | * | 1/1996 | Walker et al. ............ | 296/146.7 |
| 5,588,692 A | * | 12/1996 | Gandhi et al. ........... | 296/146.7 |
| 5,595,415 A | * | 1/1997 | Beaulat ........................ | 49/502 |
| 5,857,702 A | * | 1/1999 | Suga et al. ............... | 296/146.7 |
| 6,183,038 B1 | * | 2/2001 | Hansen et al. ........... | 296/146.7 |
| 6,226,927 B1 | * | 5/2001 | Bertolini et al. .............. | 49/502 |
| 6,302,472 B1 | * | 10/2001 | Rahmstorf et al. ....... | 296/146.6 |
| 2001/0017476 A1 | * | 8/2001 | Nishikawa et al. ....... | 296/146.7 |
| 2001/0025456 A1 | * | 10/2001 | Furuyama et al. ........ | 296/146.7 |
| 2002/0007598 A1 | * | 1/2002 | Nishikawa et al. ........... | 49/502 |
| 2002/0047289 A1 | * | 4/2002 | Furuyama et al. ........ | 296/146.7 |

FOREIGN PATENT DOCUMENTS

| | | |
|---|---|---|
| DE | 35 10 018 A | 1/1986 |
| DE | 43 20 636 A | 1/1995 |
| DE | 195 34 661 A | 7/1996 |
| DE | 197 54 180 A | 6/1998 |
| DE | 198 27 362 A | 12/1999 |
| DE | 198 56 250 C | 3/2000 |
| JP | 4 169346 | * 6/1992 |
| JP | 6 270671 | * 9/1994 |
| JP | 6 270672 | * 9/1994 |
| JP | 6 270676 | * 9/1994 |

\* cited by examiner

*Primary Examiner*—Kiran Patel
(74) *Attorney, Agent, or Firm*—Rothwell, Figg, Ernst & Manbeck

(57) ABSTRACT

Vehicle door comprising a covering and a structure having an outer wall and an inner wall in which at least one opening is provided. The covering has a panel attached to the structure and providing sealing relative to the inner wall, and a frame surrounding the panel. The panel is self-supporting. The door comprises fixing parts having a first part attached to the structure and a second part attached to the panel, the first part and the second part cooperating with one another in order to fix the panel directly to the structure, and the frame is supported by the panel.

16 Claims, 4 Drawing Sheets

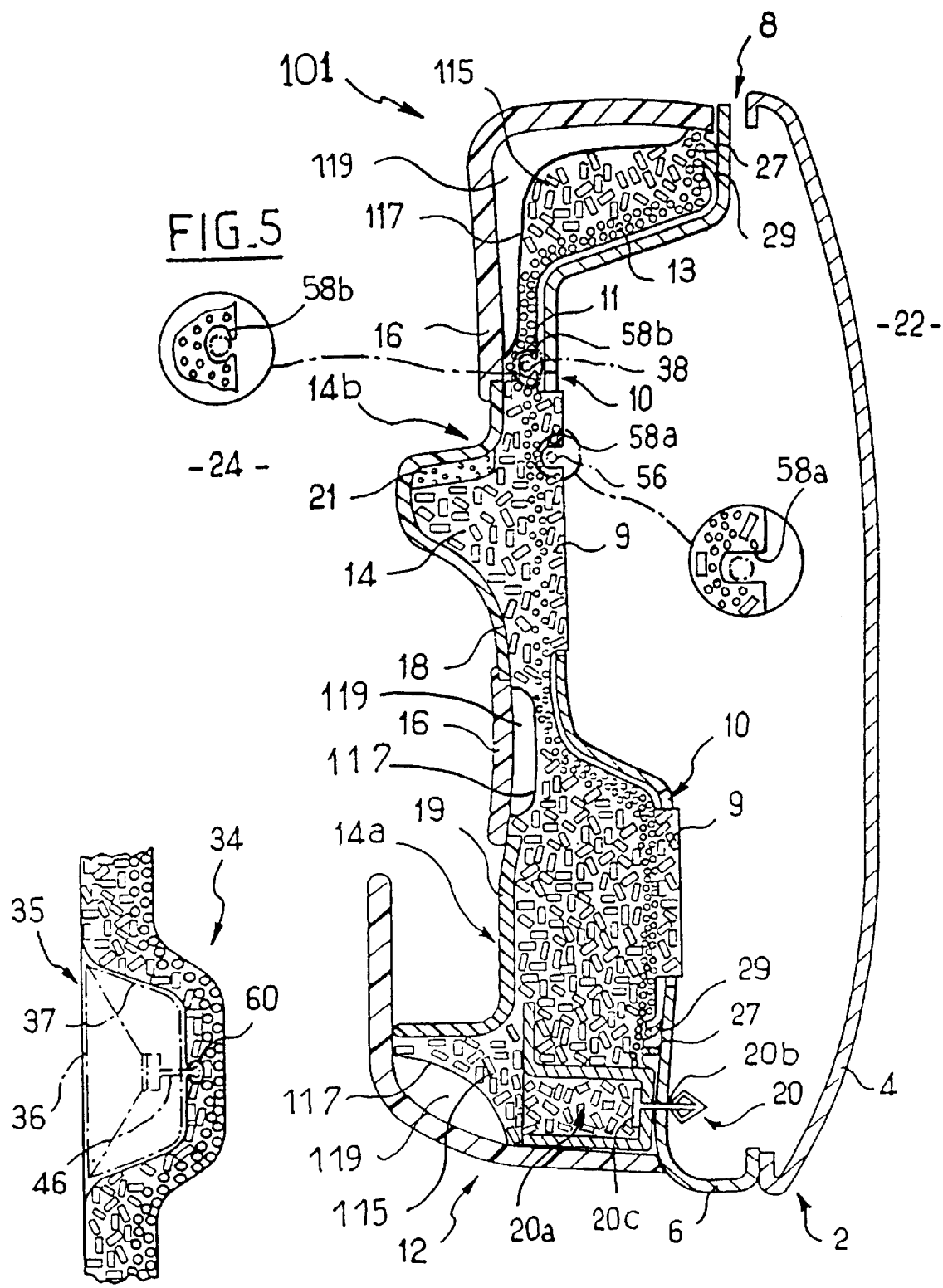

VEHICLE DOOR COMPRISING A PANEL ATTACHED DIRECTLY TO THE STRUCTURE OF THE DOOR

BACKGROUND OF THE INVENTION

The invention relates to a vehicle door, especially a motor vehicle door. Typically, such a door basically comprises a structure having an outer wall and an inner wall in which at least one opening is provided, and a covering.

SUMMARY OF THE INVENTION

The object of the invention is, in particular, to provide an air-tight and moisture-tight door which has a reduced weight, good acoustic insulation and a large capacity to absorb energy in the case of impact, and which is readily recyclable, easy to assemble and inexpensive.

DE-A-43 37 468 describes a door whose covering has a panel which is attached to the structure and which provides sealing relative to the inner wall. The covering also comprises a frame surrounding the panel in order to hold it in position relative to the inner wall. The frame is fixed to the inner wall of the structure by fixing means extending through the panel.

However, that form of door is not entirely satisfactory because its air-tightness and moisture-tightness, and also its sound-proofing have weaknesses, in particular at the site of the means for fixing the frame to the inner wall. Thus it very often proves necessary to carry out finishing operations in order to adhere to the manufacturer's specifications. Those finishing operations, which consist, in particular, in fitting foam members around the fixing means, increase the cost of the door and do not enable an entirely satisfactory quality to be achieved.

In order to overcome those various disadvantages, the invention proposes that the panel be self-supporting, that the door comprise fixing means having a first part attached to the structure and a second part attached to the panel, the first part and the second part cooperating with one another in order to fix the panel directly to the structure, and that the frame be supported by the panel.

Thus, holes permitting the passage of elements extending through the thickness of the panel and in effect reducing the efficiency of the panel are dispensed with. Furthermore, the assembly of the door is facilitated.

The invention also proposes that the panel be made of expanded plastics material.

Thus, the panel has a low weight, good acoustic insulation and a high degree of safety in the case of impact.

Another advantageous feature enabling the sound-proofing capacity of the door and its air-tightness and moisture-tightness to be improved consists in that the panel comprises a first water-tight layer and a second layer having better acoustic insulation than the first, both the first layer and the second layer being made of expanded plastics material.

The fact that the panel is produced in several layers having different sound-proofing and air- and water-tightness capacities enables the overall sound-proofing capacity of the panel to be improved while maintaining good air-tightness and water-tightness.

Another feature of the invention which is aimed at improving energy absorption by the door in the case of impact, while maintaining satisfactory sound-proofing and reducing the weight, the cost and the thickness of the door, consists in that the panel has (a) zone(s) of high density for absorbing impact against a passenger of the vehicle and (a) zone(s) of lower density for reducing the weight of the door.

In the case of impact, especially side impact, there is a risk that the door will come into contact with the occupants of the vehicle in localised zones, particularly opposite the occupants' hips. The high density of the expanded material in those zones enables the function of energy absorption to be integrated in the panel.

The invention also proposes that the panel comprise members made of expanded polypropylene and that it be at least partially covered with a decorative layer, the polypropylene members being welded (agglomerated) to one another and to the decorative layer.

Thus, the production of the panel and its connection to the decorative layer can be achieved simultaneously by melting the polypropylene.

One feature of the invention consists in that the panel comprises members made of expanded polypropylene and is at least partially covered with a sheet defining a grained solid surface obtained by melting the surface of the expanded polypropylene members.

The panel can thus be easily decorated at low cost.

In order to improve the insulation and sound absorption of the door, the invention proposes that the covering comprise at least one closed cavity.

The fact that air is trapped in the covering reduces the propagation of noise through the covering and improves the absorption thereof. In addition, the presence of that (those) cavity (cavities) reduces the weight of the covering.

Advantageously, the cavity defines an air layer between the panel and the frame.

It is therefore easy to create a double-wall phenomenon with air trapped inbetween, by providing a space between the frame and the panel, with the exception of over the entire periphery of the frame.

In order further to improve air-tightness and moisture-tightness, and also the sound-proofing capacity of the door, the invention proposes that the panel incorporate sealing means which extend along the entire periphery of the panel and which are disposed in contact with the inner wall.

That simple solution, which is inexpensive and does not complicate the assembly of the door, notably reduces leakage between the panel and the inner wall because the sealing means completely surround the opening.

Advantageously, the sealing means comprise a relatively rigid rib and a relatively flexible lip.

The rib, which is more rigid than the lip, provides for most of the sealing. The lip, because it is more flexible, completes the sealing action without complicating the assembly of the door, inasmuch as it provides only moderate resistance.

According to another advantageous feature of the invention also aimed at improving the sound-proofing capacity of the door and its air-tightness and moisture-tightness, the invention proposes that:

the panel have receptacles that are adapted to receive functional elements by surrounding them, channels be integrated in the panel, the channels being adapted to receive electrical wires that are adapted to be connected to the functional elements, the passage of the electrical wires through the panel be centralised, so that the holes extending through the panel are limited to a centralised passage for the electrical wires, a passage for the means controlling the opening of the door from inside the vehicle, possibly a passage for holding the door-operating handle on the structure and possibly a passage opposite a loudspeaker.

In particular, this solution overcomes the weaknesses of the prior art that are attributable to the passages provided in the panel for receiving the functional elements. The number of passages through the panel is reduced, which increases its efficiency from the point of view of sound-proofing and water-tightness and air-tightness. Some passages could possibly be common passages. The term "possibly" means that, in some cases, those passages could be dispensed with.

The invention also proposes that channels be integrated in the panel, the channels being adapted to receive wires or cables, and having, in succession, a substantially U-shaped section and a substantially Ω-shaped section.

The Ω-shaped channel portions define clips integrated in the panel in order to hold the wires or cables in the channels, while the U-shaped portions enable the wires to be inserted more easily into the channels.

In order further to improve the properties of the panel, the invention proposes that the panel have a portion which is inserted in the said opening. This solution does not increase the space requirement of the door because the said portion of the panel occupies a zone which was previously substantially empty.

In order to fix the panel to the structure, the invention proposes that, advantageously, the fixing means comprise units including a clip attached to a clip-holder welded to the panel, and a hole provided in the inner wall, the clip being inserted through said hole.

BRIEF DESCRIPTION OF THE DRAWINGS

The invention will emerge even more clearly from the following description which is given with reference to the appended drawings in which:

FIG. 4 is a sectional view according to the plane marked IV—IV in FIG. 2, FIG. 5 is a view, in accordance with FIG. 1, of a variant.

DETAILED DESCRIPTION OF THE PREFERRED EMBODIMENT

Figure 1:
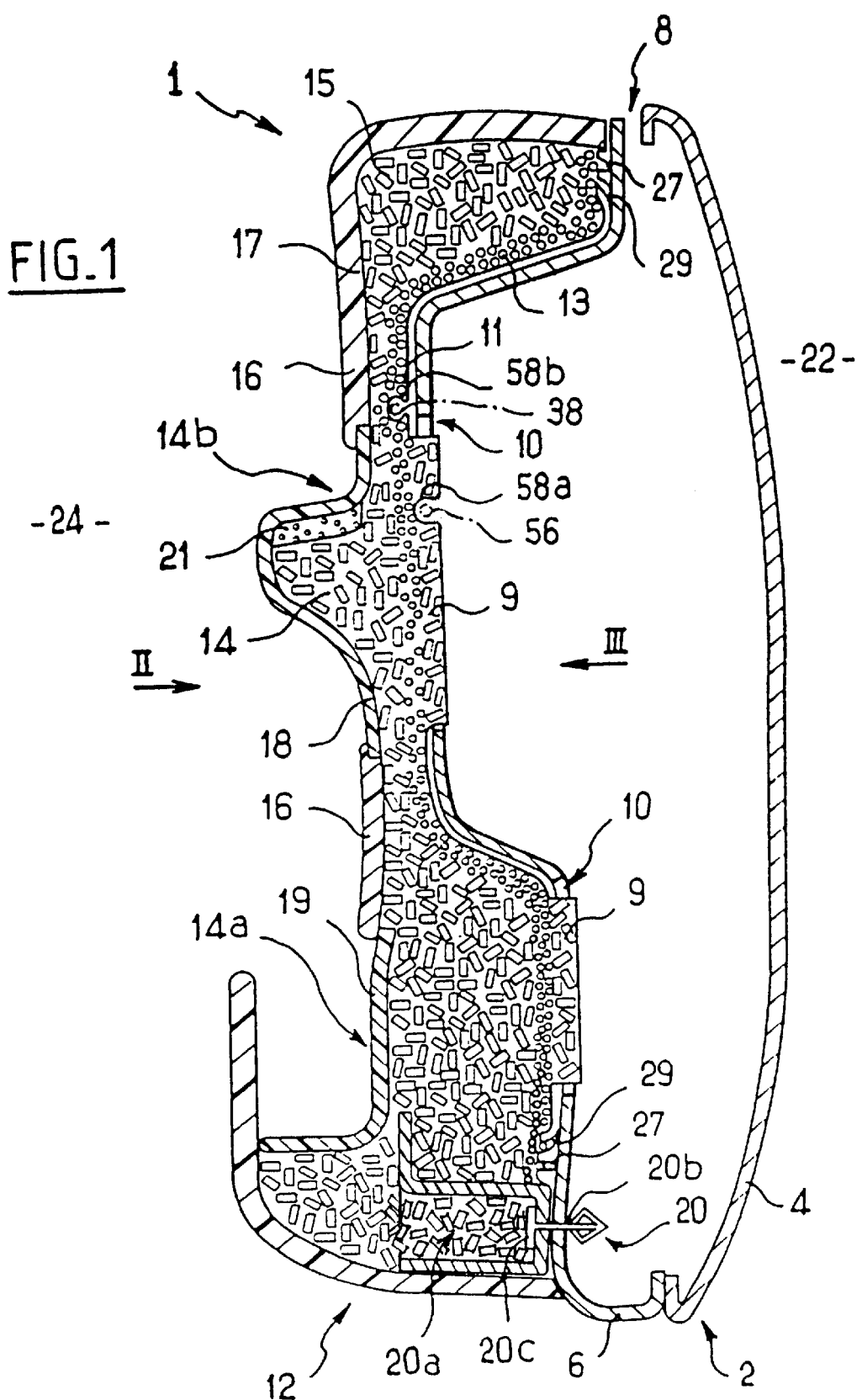
FIG. 1 is a sectional view of a door according to the invention in accordance with the plane marked I—I in FIGS. 3 and 4.
Figure 2:
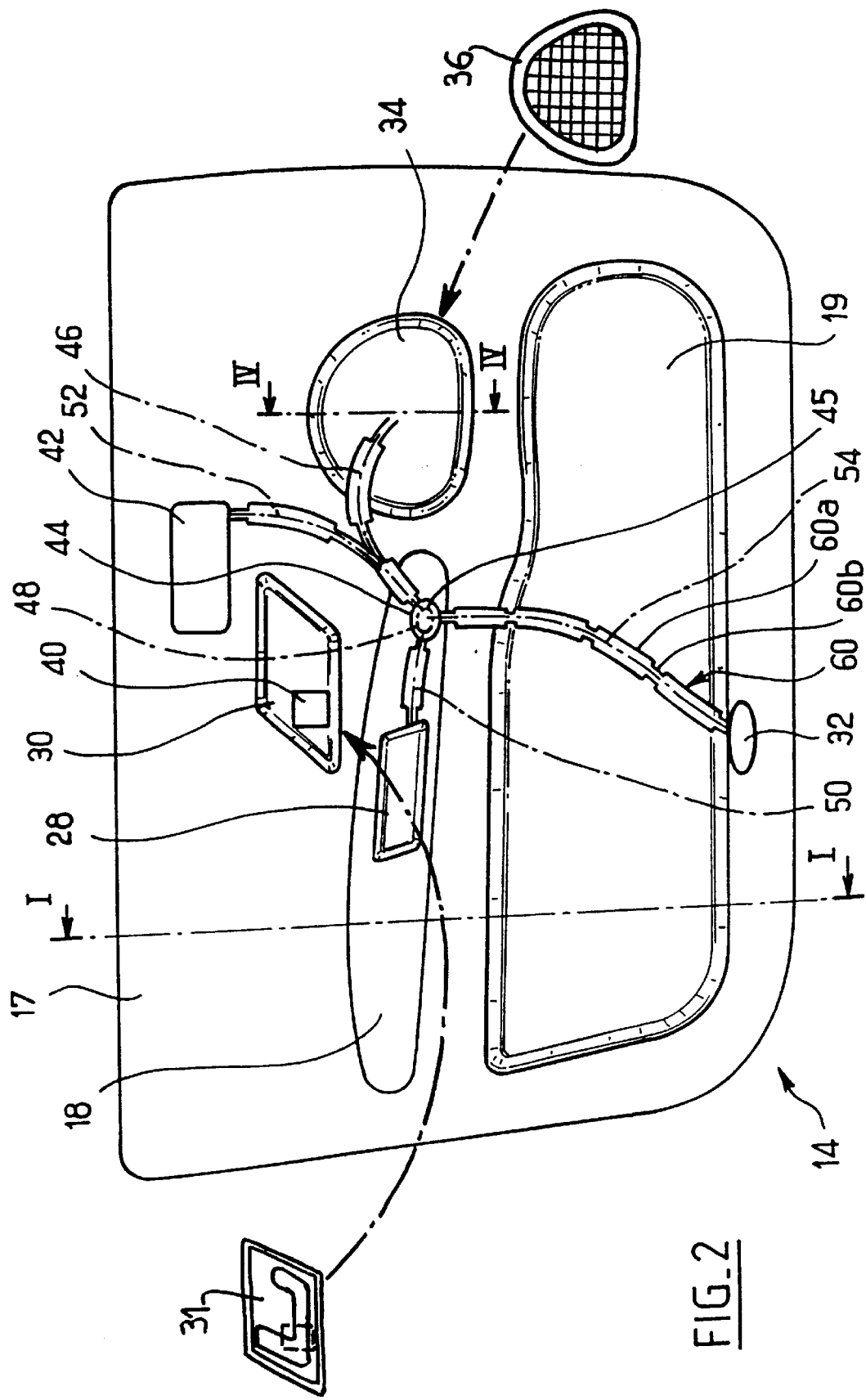
FIG. 2 is a view of the single panel of the door according to the arrow marked II in FIG. 1.

FIG. 1 shows diagrammatically a door 1 of a motor vehicle. The door comprises a structure 2 and a covering 12.

The structure 2, which is in this case made of sheet metal (it could also be made of composite material or plastics), comprises an outer wall 4 and an inner wall 6 which are welded to one another and which are, in particular, to receive between one another a pane of glass (not shown) sliding in a slot 8, and also a window winder mechanism (not shown). The inner wall 6 has openings 10 which, in particular, enable the window winder mechanism to be mounted and cables to pass through.

The covering 12 comprises a self-supporting panel 14 having an outer surface 11 and an inner surface 17, a frame 16 fixed by adhesive bonding to the panel 14 and fixing means 20 attaching the panel 14 to the structure 2.

The rigid panel 14 is constituted by expanded plastics material, in this case agglomerated members. Its inner surface 17 is covered with decorative inserts 18, 19 at the site of the armrest and the side pocket, respectively. The main function of the frame 16 is to protect the panel and to improve its appearance. It is produced on the basis of plastics material, advantageously polyolefin material, such as polypropylene, to which wood fibres may possibly be added. It has openings at the site of the armrest and the side pocket in order to show the decorative inserts 18, 19.

The fixing means 20 in this case comprise several units arranged on the periphery of the panel 14, along its lower edge and its side edges. Each of those units is constituted by an attached clip-holder 20a, which is inserted in the panel 14 to which it is fixed by ultrasonic welding, a hole 20b formed in the inner wall 6 and a clip 20c which is held on the clip-holder 20a and which is inserted in the hole 20b of the wall 6 in order to be retained therein.

Alternatively, the clip-holders could be fixed to the inner wall 6 and the panel 14 could have holes in which the clips are inserted.

In order to provide sealing between the surroundings 22 of the vehicle and the passenger cell 24, so that the outside moisture and air cannot enter the passenger cell by way of the slot 8 and the openings 10, the panel 14 incorporates sealing means 27, 29 which are in contact with the inner wall 6. Those sealing means comprise a peripheral rib 27 and a peripheral lip 29 which is more flexible than the rib 27. They extend along the entire periphery of the panel 14 and define a closed contour surrounding the openings 10. The fixing means 20 are arranged outside the closed contour.

In more detail, the panel 14 comprises two layers 13, 15. One of the layers is water-repellent and principally performs the function of providing air-tightness and moisture-tightness between the surroundings 22 and the passenger cell 24. The water-repellent layer is in this case the outer layer 13 which incorporates the outer surface 11 and which is arranged opposite the inner wall 6. It incorporates the sealing means 27, 29.

The inner layer 15 is arranged on the side where the passenger cell 24 is located and is in contact with the frame 16 by way of the inner surface 17 which it incorporates. It has better acoustic insulation qualities than has the outer layer 13. For that purpose, it is advantageously constituted by substantially tubular members having a length of between 3 millimetres and 6 millimetres, an inside diameter smaller than 1 millimetre and an outside diameter of between 2 millimetres and 4 millimetres. The outer layer 13 is for its part advantageously constituted by substantially spherical members, the diameter of which is between 1 millimetre and 3 millimetres.

The panel 14 is produced by placing in a mould the decorative layer 18, a foam block 21 connected to the reverse side of the decorative layer 18, the tubular members, and then the spherical members of expanded polypropylene and by injecting vapour at elevated temperature in order to cause the polypropylene to melt, so that the tubular and spherical members are welded, on the one hand, to one another in order to agglomerate and, on the other hand, to the decorative layer 18 and the foam block 21 in order to hold them in position.

The foam block 21 is thus interposed between the decorative layer 18 and the panel 14. It imparts a more flexible feel to the armrest. It is advantageously made of polyolefin plastics material in order to facilitate its recycling with the panel 14. The foam is preferably made of expanded polyethylene.

The decorative layer 18 can be produced from the usual materials, such as, especially, polyvinyl chloride, polypropylene, woven fabric, leather, carpeting, or by flocking.

The sheet 19 is produced by graining the facing surface of the mould and by concentrating the injection of vapour at elevated temperature, in order to cause the surface of the expanded polypropylene members to melt and to form a grained solid surface defining the sheet 19.

The panel 14 also has zones 14a, 14b having different densities. The zone 14a, which is to be substantially opposite the hip of an occupant of the vehicle, has a high density in comparison with the zone 14b. The higher density of the zone 14a gives it greater resistance to stresses and consequently higher energy-absorbing power in the case of impact. Consequently, it will be better able to protect the occupant of the vehicle.

Furthermore, the thickness of the zone 14a is enlarged relative to that of the zone 14b, which further increases its energy-absorbing capacity and compensates for the lower degree of acoustic sound-proofing relative to the zone of lower density 14b.

In addition, the panel has various receptacles 28, 30, 32, 34 for receiving functional elements. The illustrated receptacles 28, 30, 32, 34 are intended to receive, respectively, a window winder plate, an inner door handle unit for controlling the opening of the door, a lighting device and a loudspeaker. As illustrated especially in FIG. 4, the receptacles basically form a facing which is free from passages through the panel 14, so that they surround the functional element and isolate it from the inner wall 6 by the presence of the two layers 13, 15 of the panel. Therefore, they are basically opened only on the inner face 17.

In more detail, FIG. 4 shows the receptacle 34 and also, with a dot-dash line, a unit 35 comprising a loudspeaker 36, its electrical wire 46 and a case 37 supporting the loudspeaker 36 and forming a sound box.

Figure 3:
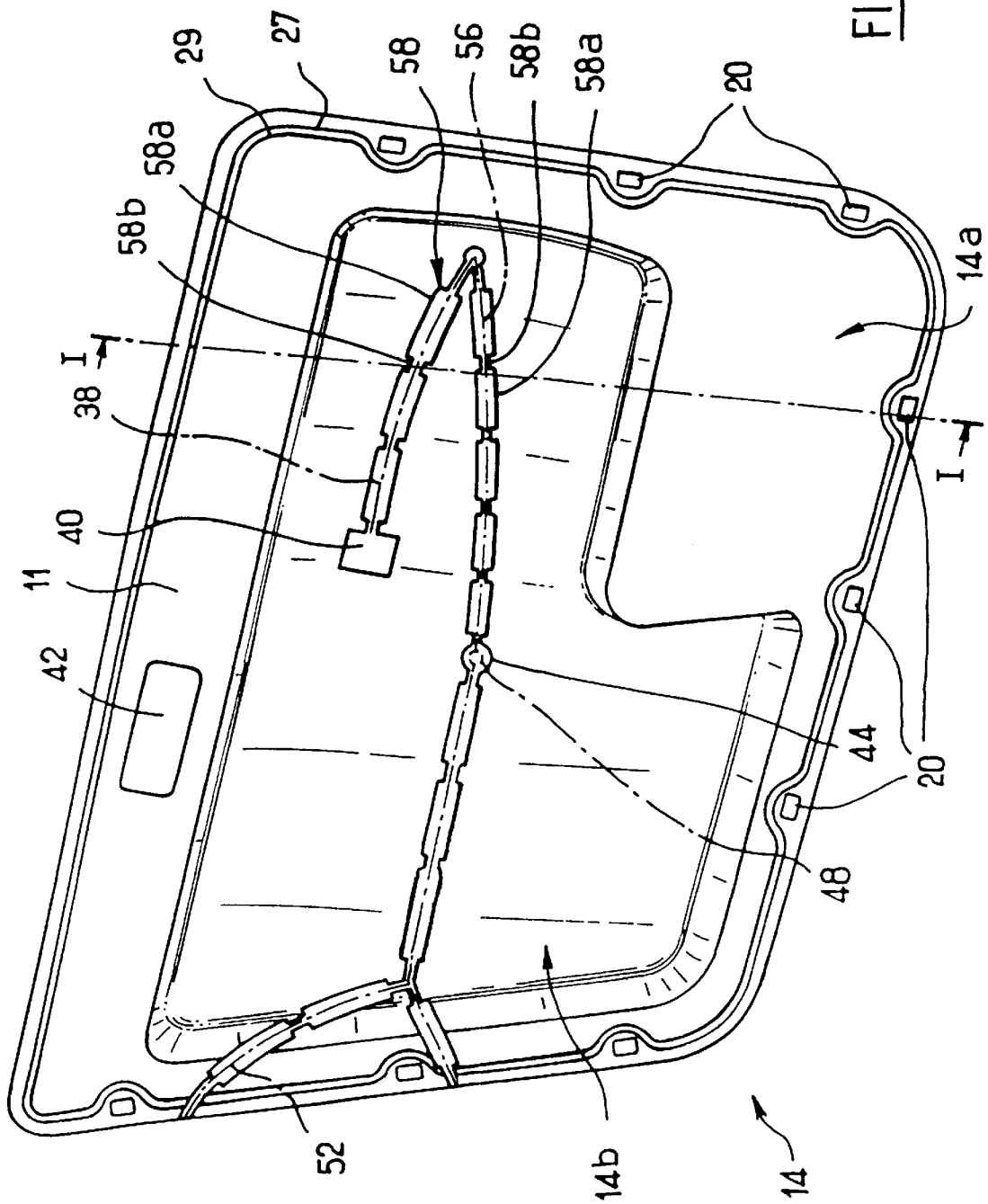
FIG. 3 is a view of the single panel of the door according to the arrow marked III in FIG. 1.

Only the receptacle 30 which is to receive the inner handle 31 for controlling the opening of the door has a passage 40 through the panel in order to enable the means controlling the opening of the door to operate a cable 38 which is shown with a dot-dash line in FIG. 3 and which extends between the panel 14 and the outer wall 6.

The panel also has two other passages 42, 44 through the self-supporting panel 14. The passage 42 enables the door-operating handle to be held firmly by passing the latter's support (not shown) through the passage 42 in order to fix it to the inner wall 6. For its part, the passage 44 enables an electrical cable 48 bringing together all of the electrical wires 46, 50, 52 and 54 to extend through the panel 14. The passage 44 is closed by a sealing membrane 45 through which the cable 48 extends.

The electrical wire 50 is connected to the window winder plate in order to supply the corresponding electrical motor with power, the electrical wire 52 is connected, at one end, to a wing mirror control and, at the other end, to an electrical device for moving the wing mirror, the electrical wire 54 supplies the lighting device with power, while an electrical wire 56 is connected to an electrical device for latching the lock.

The electrical wires are held in channels 58, 60 hollowed out of the panel both on the outer surface 11 and on the inner surface 17, respectively. They comprise in succession a portion 58a, 60a having a U-shaped section, then a portion 58b, 60b having an Ω-shaped section, the small opening of which forms a clip retaining the electrical wires (FIG. 5, enlarged cut-away views).

FIG. 5 illustrates a variant. Unaltered elements carry the same reference in FIG. 5 as in the previous Figures, while modified elements carry a reference increased by 100.

The door variant 101 is distinguished from the door 1 in that it comprises closed cavities 119 extending along the frame 16 and defining air layers. Those cavities 119 are hollowed out of the inner layer 115 of the panel 114. They extend opposite the frame 16, leaving a margin of a few centimetres from the edge of the frame 16, either at the periphery of the frame 16 or around the openings formed in the frame 16. That margin on the one hand prevents the air contained in the cavities 119 from escaping therefrom and, on the other hand, prevents interference with the holding of the decorative layer 18 in position.

The thickness of the air layers 119 is substantially constant and represents approximately from one quarter to half of the thickness of the panel 14.

It will be appreciated that the invention is not in any way limited to the drawings which have been described by way of non-limiting example. Thus, it would be possible for there to be no clear boundary between the outer layer and the inner layer of the panel, so that there would be a continuous variation in the features of the panel between the outer surface and the inner surface.

A passage could be provided in the panel, opposite the loudspeaker, in order to use the space between the outer wall and the inner wall as a sound box. Sealing could be provided by a non-woven sheet forming a membrane and closing the passage.

It would also be possible to reduce the number of passages through the panel by grouping them together.

In addition, the clip-holders could be welded to the outer surface 13 of the panel 14 instead of being inserted into the panel, insofar as the strength of the panel 14 would permit such action.

What is claimed is:

1. A vehicle door comprising
   a door structure comprising an outer wall and an inner wall, the inner wall having at least one opening provided therethrough,
   a decorative covering comprising:
      a self-supporting panel adapted to define a watertight barrier in front of the inner wall,
      a frame surrounding the self-supporting panel, the frame being fixed to the self-supporting panel, and
   fixation means comprising a first part attached to the door structure and a second part attached to the self-supporting panel, the first part and the second part comperating to each other for directly fixing the self-supporting panel to the door structure.

2. The vehicle door of claim 1, wherein the self-supporting panel is made of an expanded plastic material.

3. The vehicle door of claim 2, wherein the self-supporting panel comprises a watertight first layer and a second layer, the second layer having a sound proofing effect higher than the first watertight layer, both the first watertight layer and the second layer being made of an expanded plastic material.

4. The vehicle door of claim 3, wherein the second layer comprises tubular members having a length comprised between three millimeters and six millimeters and an outer diameter comprised between two millimeters and four millimeters.

5. The vehicle door of claim 2, wherein the self-supporting panel has a first zone having a high density for mechanically absorbing a shock with a passenger of the vehicle and a second zone having a density less than the first zone, for limiting the weight of the vehicle door.

6. The vehicle door of claim 1, wherein the self-supporting panel comprises members made of expanded polypropylene and is at least partially covered with a decorative layer, the polypropylene members being welded to each other and to the decorative layer.

7. The vehicle door of claim 6, wherein a foam layer made of a polyolefinic plastic material is interposed between the decorative layer and the self-supporting panel.

8. The vehicle door of claim 2, wherein the self-supporting panel comprises members made of expanded polypropylen and is at least partially covered with a sheet defining a granulated solid surface obtained by superficially fusing the expanded polypropylen members.

9. The vehicle door of claim 1, wherein the decorative covering encloses at least one closed cavity.

10. The vehicle door according to claim 9, wherein the closed cavity defines an air layer between the self-supporting panel and the frame.

11. The vehicle door according to claim 1, wherein sealing means are integrated to the self-supporting panel, the sealing means extending all along the periphery of the self-supporting panel and being disposed in contact with the inner wall.

12. The vehicle door according to claim 11, wherein the sealing means comprises a rigid rib and a flexible tongue.

13. The vehicle door of claim 1, wherein:

the self-supporting panel has an inner face and an outer face, the inner face having concave receptacles adapted for receiving functional elements therein, channels are integrated in the self-supporting panel, the channels being adapted for receiving electrical cables therein, the electrical cables being adapted to be connected to the functional elements, the self-supporting panel has only a few openings passing through it, said openings consisting exclusively in a first passage for centrally passing the electrical cables therethrough, a second passage for passing an element of a vehicle door inner handle unit, possibly a third opening for fixing the vehicle door inner handle unit to the door structure, and possibly a fourth opening in front of at least one loudspeaker.

14. The vehicle door of claim 1, wherein channels are integrated in the self-supporting panel, the channels being adapted for receiving cables, the channels have a first U-shaped section and a second omega-shaped section.

15. The vehicle door of claim 1, wherein the self-supporting panel has a portion engaged within the opening of the inner wall.

16. The vehicle door of claim 1, wherein the fixing means comprise units including a staple attached to a staple-holder element welded to the self-supporting panel and a hole provided through the inner wall of the door structure, the staple being engaged through said hole.

* * * * *